US011904528B2

(12) United States Patent
Korshikov et al.

(10) Patent No.: US 11,904,528 B2
(45) Date of Patent: Feb. 20, 2024

(54) THREE-DIMENSIONAL PRINTING OF FREE-RADICAL POLYMERIZABLE COMPOSITES WITH CONTINUOUS FIBER REINFORCEMENT FOR BUILDING COMPONENTS AND BUILDINGS

(71) Applicant: Mighty Buildings, Inc., San Francisco, CA (US)

(72) Inventors: Vasily Korshikov, Moscow (RU); Anna Ivanova, Moscow (RU); Egor Yakovlev, Moscow (RU); Maxim Bobryshev, Moscow (RU); Vasiliy Chekhotsiy, Moscow (RU); Sergei Naumov, Moscow (RU); Alexey Dubov, San Mateo, CA (US); Dmitry Starodubtsev, Moscow (RU); Evald Lepp, Moscow (RU); Stanislav Gudkov, Moscow (RU)

(73) Assignee: Mighty Buildings, Inc., Oakland, CA (US)

( * ) Notice: Subject to any disclaimer, the term of this patent is extended or adjusted under 35 U.S.C. 154(b) by 104 days.

(21) Appl. No.: 17/183,335

(22) Filed: Feb. 23, 2021

(65) Prior Publication Data

US 2022/0266516 A1 Aug. 25, 2022

(51) Int. Cl.
*B29C 64/336* (2017.01)
*B29C 64/209* (2017.01)
(Continued)

(52) U.S. Cl.
CPC .......... *B29C 64/118* (2017.08); *B29C 64/165* (2017.08); *B29C 64/336* (2017.08);
(Continued)

(58) Field of Classification Search
CPC ... B29C 64/118; B29C 64/185; B29C 64/336; B29C 64/165; B29C 64/209;
(Continued)

(56) References Cited

U.S. PATENT DOCUMENTS 5,936,861 A * 8/1999 Jang ..................... B33Y 30/00
700/98
2002/0063349 A1 5/2002 Edwards et al.
(Continued)

FOREIGN PATENT DOCUMENTS

DE 102016123631 * 6/2018 ............. B29C 4/118

OTHER PUBLICATIONS

International Search Report in International Application No. PCT/US2022/017363, dated Jun. 27, 2022.
(Continued)

*Primary Examiner* — Joseph S Del Sole
*Assistant Examiner* — Baileigh Kate Darnell
(74) *Attorney, Agent, or Firm* — Cognition IP, P.C.; Edward Steakley; Justin White

(57) ABSTRACT

A 3D printing apparatus can include a base composite material channel configured to pass a base composite material therethrough, a fiber strand channel configured to pass a fiber strand therethrough, and a fiber feeding component configured to feed the fiber strand through the fiber channel. The fiber strand can be separate from the base composite material before entering the 3D printing apparatus, and the fiber feeding component can facilitate combining of the fiber strand with the base composite material to form a layer of a 3D printed building component with the fiber strand within the base composite material. An impregnation material channel may be included to pass an impregnation liquid or material to impregnate the fiber strand while the fiber strand is within the 3D printing apparatus.

22 Claims, 10 Drawing Sheets

(51) Int. Cl.
  *B33Y 30/00* (2015.01)
  *B33Y 40/00* (2020.01)
  *B29C 64/118* (2017.01)
  *B33Y 10/00* (2015.01)
  *B29C 64/165* (2017.01)

(52) U.S. Cl.
  CPC .............. *B33Y 10/00* (2014.12); *B33Y 30/00* (2014.12); *B33Y 40/00* (2014.12)

(58) Field of Classification Search
  CPC ....... B29C 64/314; B29C 70/10; B33Y 30/00; B33Y 40/00; B33Y 40/10; B33Y 70/10
  See application file for complete search history.

(56) References Cited

U.S. PATENT DOCUMENTS

| | | | |
|---|---|---|---|
| 2014/0291886 A1* | 10/2014 | Mark | B29C 69/001 264/259 |
| 2019/0061251 A1 | 2/2019 | Chanclon et al. | |
| 2019/0202117 A1 | 7/2019 | Alfson et al. | |
| 2019/0218056 A1 | 7/2019 | Chen | |
| 2019/0315054 A1 | 10/2019 | Alvarado et al. | |

OTHER PUBLICATIONS

Matsuzaki et al. "Three-dimensional printing of continuous-fiber composites by in-nozzle impregnation," Scientific reports Mar. 11, 2016.

\* cited by examiner

THREE-DIMENSIONAL PRINTING OF FREE-RADICAL POLYMERIZABLE COMPOSITES WITH CONTINUOUS FIBER REINFORCEMENT FOR BUILDING COMPONENTS AND BUILDINGS

TECHNICAL FIELD

The present disclosure relates generally to three-dimensional printing, and more particularly to the three-dimensional printing of building components and structures.

BACKGROUND

Fiber reinforcement of composite materials is common in industries such as automobiles, aircraft, and civil engineering for improving the overall load capacity of the composite materials. Recent applications in the field of three-dimensional ("3D") printing include forming complex parts having a primary material matrix reinforced internally with continuous fibers. This can involve 3D printing utilizing continuous fibers embedded within different kinds of material matrices and with a diversity of core compositions.

For example, a thermoplastic material can be applied as a primary matrix material and continuous fibers can be used as a second reinforcing material. This typically involves a composite fiber impregnated with a thermoplastic matrix. A composite fiber strand or "filament" can be put into an extruder where the filament is heated to a temperature exceeding the melting point of the matrix material, after which a melted layer is extruded through the nozzle and a deposited part can be formed in layers. Dry fibers can be impregnated with a fast curing thermoset resin in situ rather than using costly prepreg fibers, such as by impregnating the fibers inside the printer during the printing process. The impregnated fibers can then be pulled through the printer and cured using a high-intensity energy source, resulting in a 3D composite part.

Unfortunately, it can be difficult to ensure a high-quality impregnation of the fibers with thermoplastics due to the extremely high viscosity of the melted thermoplastic material. The resulting printed composite can be too porous, such that the fibers and the hardened thermoplastic do not work well together. Although applying extremely high pressure may overcome this tendency toward poor impregnation quality, high pressure can then cause damage to the fibers and lead to an uneven internal structure of the finished printed material.

Further disadvantages of supplying the thermoplastic as a filament into an extruder are that this limits the diversity of matrix materials that can be used to manufacture the printed parts and can also significantly increase production costs. Yet another disadvantage of using a filament is that the types of fibers used and the percentages of reinforcing materials in the thermoplastic are rigidly determined by the original manufacture of the reinforced filament, which severely restricts finished product design flexibility and diminishes the ability to print or manufacture 3D objects having a complex structure.

Additional drawbacks can arise where mostly homogeneous plastic or other materials are used, which have shown to be relatively inferior in terms of strength and efficiency. In particular, current 3D printing techniques using fiber-reinforced materials are inadequate in the field of building construction due to final products having insufficient load-bearing capabilities, flame retardancy, and other finished material properties that are required to meet the relatively high-performance standards for building construction.

Although traditional ways of 3D printing fiber-reinforced items have worked well in the past, improvements are always helpful. In particular, what is desired are systems and methods for 3D printing fiber reinforced products having material properties that meet the high-performance standards of the building construction industry and with greater design flexibility.

SUMMARY

It is an advantage of the present disclosure to provide improved systems and methods for 3D printing fiber-reinforced building components having material properties that meet the high-performance standards of the building construction industry, as well as providing greater design flexibility in such systems and methods. The disclosed features, apparatuses, systems, and methods provide improved 3D solutions that involve the 3D printing of layers having fiber-reinforced cores. These advantages can be accomplished at least in part by combining a separate base composite material with a separate fiber strand at the printing apparatus itself during the printing process and can also involve saturation of the fiber strand with an impregnation fluid as a binder to strengthen the contact between the base composite material and the fiber strand.

In various embodiments of the present disclosure, a 3D printing apparatus can include at least a base composite material channel, a fiber strand channel, and a fiber feeding component. The base composite material channel can be configured to pass a base composite material through the 3D printing apparatus. The fiber strand channel can be configured to pass a fiber strand through the 3D printing apparatus, and the fiber strand can be separate from the base composite material at least upon entry into the 3D printing apparatus. The fiber feeding component can be configured to feed the fiber strand through the fiber channel in order to facilitate the combining of the fiber strand with the base composite material to form a layer of a 3D printed building component with the fiber strand within the base composite material.

In various detailed embodiments, the separate fiber strand can be pre-impregnated with an impregnation material prior to entering the 3D printing apparatus. In other detailed embodiments where a pre-impregnated fiber strand is not used, the 3D printing apparatus can further include an impregnation material channel configured to pass an impregnation material to impregnate the fiber strand while the fiber strand is within the 3D printing apparatus. The 3D printing apparatus can also include a base composite material supply connector configured to couple the base composite material channel to a separate replaceable base composite material supply, a fiber strand supply connector configured to couple the fiber strand channel to a separate replaceable fiber strand supply, and, where an impregnation material is used, an impregnation material supply connector configured to couple the impregnation material channel to a separate replaceable impregnation material supply. Impregnation of the fiber strand can take place after the fiber strand has passed the fiber feeding component.

In further detailed embodiments, the impregnation material can be a liquid and the volume of impregnation liquid passing through the impregnation material channel ranges from about 0.2 to 8.0 L/hr. In addition, the volume of base composite material passing through the base composite material channel can range from about 8 to 245 L/hr, and the extrusion speed of the fiber strand can range from about 40 to 1000 mm/s. In some arrangements, an outlet of the fiber strand channel can be positioned above an outlet of the base composite material channel to facilitate extrusion of the fiber strand on top of the extruded base composite material. In other arrangements, an outlet of the fiber strand channel can be positioned below an outlet of the base composite material channel to facilitate extrusion of the fiber strand underneath the extruded base composite material. The 3D printing apparatus can also include a coupling component configured to couple the 3D printing apparatus to a moving printing device, which can be a computer numerical control system or robotic arm. The resulting 3D printed building component can have material properties that meet or exceed standard building construction codes.

In various further embodiments of the present disclosure, a 3D printing system can include a movable printer head housing a plurality of 3D system components, a base composite material channel located within the printer head and configured to pass a base composite material through the printer head, a fiber strand channel located within the printer head and configured to pass a fiber strand through the printer head, wherein the fiber strand is separate from the base composite material, an impregnation material channel located within the printer head and configured to pass an impregnation material to impregnate the fiber strand while the fiber strand is within the printer head, and a fiber feeding component located within the printer head and configured to feed the fiber strand through the fiber channel. The fiber feeding component can facilitate the combining of the fiber strand with the base composite material to form a layer of a 3D printed building component with the fiber strand within the base composite material, and the 3D printed building component can have material properties that meet or exceed standard building construction codes.

The 3D printing system can also include a base composite material supply that is replaceable and that supplies the base composite material into the base composite material channel, a base composite material supply connector coupling the base composite material channel to the base composite material supply, a fiber strand supply that is replaceable and that supplies the fiber strand into the fiber strand channel, a fiber strand supply connector coupling the fiber strand channel to the fiber strand supply, an impregnation material supply that is replaceable and that supplies the impregnation material into the impregnation material channel, and an impregnation material supply connector coupling the impregnation material channel to the impregnation material supply. The 3D printing system can also include a moving printing device configured to move the printer head during operation of the 3D printing system and a coupling component coupling the printer head to the moving printing device.

In still further embodiments of the present disclosure, various methods of 3D printing a building component having material properties that meet or exceed standard building construction codes are provided. Pertinent process steps can include supplying a base composite material through a base composite material channel within a 3D printing apparatus, directing a fiber strand through a fiber strand channel within the 3D printing apparatus, wherein the fiber strand is separate from the base composite material, extruding the fiber strand and the base composite material simultaneously through at least one nozzle to form a printed layer having the fiber strand within the base composite material, and curing the printed layer using electromagnetic radiation or heat.

In various detailed embodiments, the fiber strand can be pre-impregnated with an impregnation material prior to entering the 3D printing apparatus. In other detailed embodiments where a pre-impregnated fiber strand is not used, method steps can also include providing an impregnation material through an impregnation material channel within the 3D printing apparatus and saturating the fiber strand with the impregnation material within the 3D printing apparatus to form an impregnated fiber strand. The impregnation material can be a liquid and the volume of impregnation liquid passing through the impregnation material channel can range from about 0.2 to 8.0 L/hr. In various arrangements, the steps of extruding and curing can be repeated until the building component is formed, with the building component having multiple printed layers.

In various detailed embodiments, the base composite material can include at least one acrylic monomer or oligomer, inorganic fillers, and at least one soluble polymerization initiator. The base composite material can also include a thickener, an adhesion promoter, a toughening agent, one or more plasticizers, and/or at least one flame retardant. Also, the fiber strand can include one or more materials selected from the group consisting of nylon, aramid, carbon, glass fiber, basalt, and silk. In some arrangements, the fiber strand can be extruded on top of the base composite material. In other arrangements, the fiber strand can be extruded such that it is at least partially inserted into the base composite material.

The electromagnetic radiation can include ultraviolet light having a wavelength in a range from about 200 to 420 nm and light intensity in a range from about 0.1 to 10 W/cm$^2$. Also, the volume of base composite material passing through the base composite material channel ranges from about 8 to 245 L/hr and the extrusion speed of the fiber strand ranges from about 40 to 1000 mm/s. Still further, the base composite material can include one or more plasticizers that form from about 1% to 12% of the base composite material by weight, and the one or more plasticizers can include at least tris(chloropropyl)phosphate, tricresyl phosphate, or tris(2-ethylhexyl)trimellitate. The viscosity of the base composite material can range from about 100,000 to 160,000 cP and use of the one or more plasticizers can result in a relative warpage level from about 0.05% to 0.15% in the printed building component. The fiber strand can have a diameter ranging from about 0.7 to 6 mm and the printed layer has a thickness ranging from about 3 to 8 mm and a width ranging from about 10 to 26 mm. In various arrangements, the fiber strand dimensions can be defined by load requirements and dimensions of the printed layer and the fiber strand has a cross-sectional area that ranges from about 1% to 20% of the average cross-sectional area of the printed layer.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for 3D printing building components from fiber-reinforced composite materials. These drawings in no way limit any changes in form and detail that may be made to the disclosure by one skilled in the art without departing from the spirit and scope of the disclosure.

DETAILED DESCRIPTION

Figure 1:
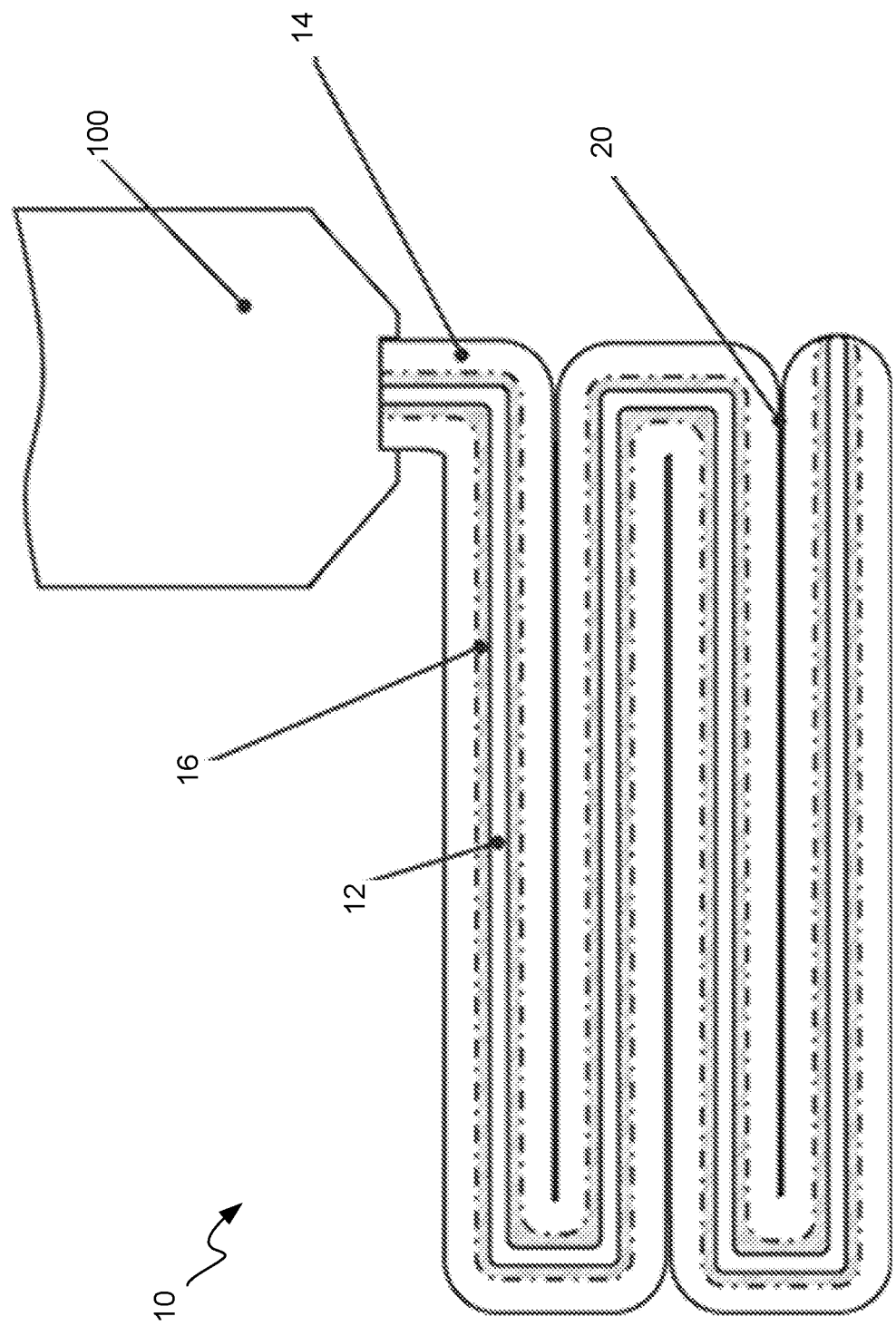
FIG. 1 illustrates in side cross-section view an example fiber-reinforced composite material being 3D printed in layers according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well-known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for 3D printing building components from fiber-reinforced composite materials. The disclosed embodiments provide more versatile ways of forming improved fiber-reinforced material during a 3D printing process. In particular, the disclosed embodiments can involve combining a base composite material and a separate fiber strand during the 3D printing process itself, rather than prior to the 3D printing process. Addition of an impregnation material to the fiber strand can also take place during the 3D printing process, rather than using an already impregnated fiber strand. Functional fillers embedded in the photocurable base composite material can provide additional desired characteristics for the finished 3D printed building components, such as enhanced strength, fire-resistance, thermal conductivity, and the like.

Combining separate base composite materials and fiber strands during the actual 3D printing process can allow for greater varieties and material combinations, more complex structures, and stronger printed building components and other 3D printed objects, with applications in the construction industry and beyond. Building components and parts can be manufactured or printed rapidly and directly from computer-aided design models without geometry limitations and with high material utilization. Flexible and faster printing speed variations can also significantly reduce the time required for the 3D printing of structural building components and other items.

In various embodiments, a cutting device can provide increased flexibility and functionality of the 3D printed components by allowing selective reinforcement of fiber strands into the finished materials according to the desired features of a given construction element. In various arrangements, improvements over existing technologies can include impregnation of the fiber strand with a thermoset and pre-curing the fiber strand as a separate phase of material pretreatment before printing. In such arrangements, both the fiber strand and the thermoset can be fed into the extruder, which can then bind the fibers together during printing.

Some advantages realized by the disclosed embodiments can include strong adhesion of the embedded fiber strands inside the base composite materials and improved mechanical properties of the final printed objects, which can be the result of rapid solidification of the fiber strand after it has been impregnated with a photosensitive composition having higher chemical compatibility with the base composite material.

In various arrangements, the base composite material may be formed from a variety of materials and in a variety of combinations. For example, the base composite material matrix may include different polymeric materials, such as one or more acrylic monomers and/or oligomers. In addition, the base composite material may be pre-polymerized in order to enhance the viscosity of the overall composite. In some configurations, a combination of inorganic fillers and at least one functional filler may be used.

In various embodiments, the composition of the impregnation material may be changed by replacing some components and/or adding one or more supplementary additives to affect the solidification conditions of the fiber strand.

In some embodiments, a cutting device can be used to sever the fiber strand on demand to provide increased functionality and variability within the printed objects. An alternative reinforcing material may continuously be fed into the continuously printed layer, or the layer may continue to be printed with only the base composite material.

The fiber strand linear density may be varied in some cases to result in specific desirable material properties. In some configurations, the matrix of the base composite material may include plasticizers or other substances for enhancement of material features to reduce the warpage effect during and after printing. In addition, fiber reinforcement may be performed by extruding multiple fiber strands simultaneously to provide even greater functionality and flexibility of the properties of the 3D printed objects.

Although various embodiments disclosed herein discuss the 3D printing of building structures and components, it will be readily appreciated that the disclosed features, apparatuses, systems, and methods can similarly be used for any relevant 3D printed part or item. For example, the disclosed systems and methods can be used to produce 3D printed objects that are not building components or parts. Other applications, arrangements, and extrapolations beyond the illustrated embodiments are also contemplated.

Referring first to FIG. 1, an example fiber-reinforced composite material being 3D printed in layers is illustrated in side cross-section view. Printed layers 10 can be printed by a printing apparatus 100 in a continuous path 20 layer by layer. Printing apparatus 100 can include a printer head, nozzle, material channels, and a fiber feeding component, among various other components, as set forth in greater detail below. Each printed layer can include a fiber strand 12 embedded within a base composite material 14, with a fiber strand to base composite material interface 16 existing where the fiber strand 12 and base composite material 14 meet.

Layer formation can be performed through the solidification of extruded material from the printing apparatus by way of heat or electromagnetic radiation, such as ultraviolet ("UV") light. Heat and/or a broad range of light irradiation wavelengths may be used depending upon the type of polymerization initiator in the material being cured. For example, UV light in the range of 390-400 nm, 400-410 nm, or 410-420 nm may be used. Other wavelength ranges are also possible, as will be readily appreciated. In general, a free-radical polymerizable composition of the base composite material 14 can allow for high-speed printing in a layer by layer process as shown without the need for temporary assisting support structures.

In various embodiments, the fiber strand 12 can be saturated or impregnated within the printing apparatus 100 just prior to printing. This can be performed using an impregnation liquid or other material that is sensitive to electromagnetic radiation or heat treatment. The impregnation material can have a low viscosity (e.g., 10-100 mPs*s), such that individual monofilaments can be easily lubricated and a strong bond can be created between the fiber strand 12 and the base composite material 14 at the interface 16 after curing or solidification.

In some embodiments, fiber strands infiltrated with a free-radical polymerizable binder within the impregnation material may solidify rapidly due to the higher speed of the polymerization kinetics of the impregnation material. The composition of the impregnating liquid or material can be developed in such a way that it allows for the complete curing of the binder during the curing stage, such as a first UV light passage just after extrusion. The impregnating material can be a composition mixture, and the chemical compatibility of the impregnation mixture and the organic component of the base composite material 14 can provide a strong contact adhesion at the fiber strand to base composite material interface 16. In various embodiments, the impregnated or "wetted" fiber strand 12 can be kept cool and away from light or other sources of curing radiation between impregnation and extrusion so as to prevent premature curing prior to extrusion when curing is then desired.

Polymerization of the base composite material 14 may be achieved in phases. For example, a first UV lamp passage can result in the base composite material 14 reaching approximately 50-60% of full polymerization, with increasing polymerization over the following 3-6 UV lamp passages as further layers are sequentially deposited, after which the material can achieve a maximum polymerization level of about 80-90% to form strong interlayer adhesion.

The fiber strand 12 can adhere to the extruded base composite material 14 so that the fiber strand can be pulled out continually by a print head, extruder, or other similar components, which can be coupled to a separate robotic arm or tool gear to follow a toolpath and generate a layer-by-layer structure of the overall part or printed building component. In some embodiments, multiple reinforcements may be simultaneously applied, the reinforcements may be of the same type and have the same diameter and cross-sectional shape.

In one non-limiting example for purposes of illustration, the fiber strand 12 can be a glass fiber strand. An example linear density of the glass fiber strand may range from about 1200 Tex to about 19200 Tex, although other suitable values are also possible. The diameter of the glass fiber strand may range from about 0.7 mm to about 6 mm, which can be varied appropriately taking into account the dimensions of the extruded base composite material. For example, the thickness of the overall extruded layer may range from about 3 mm to about 8 mm.

Figure 2:
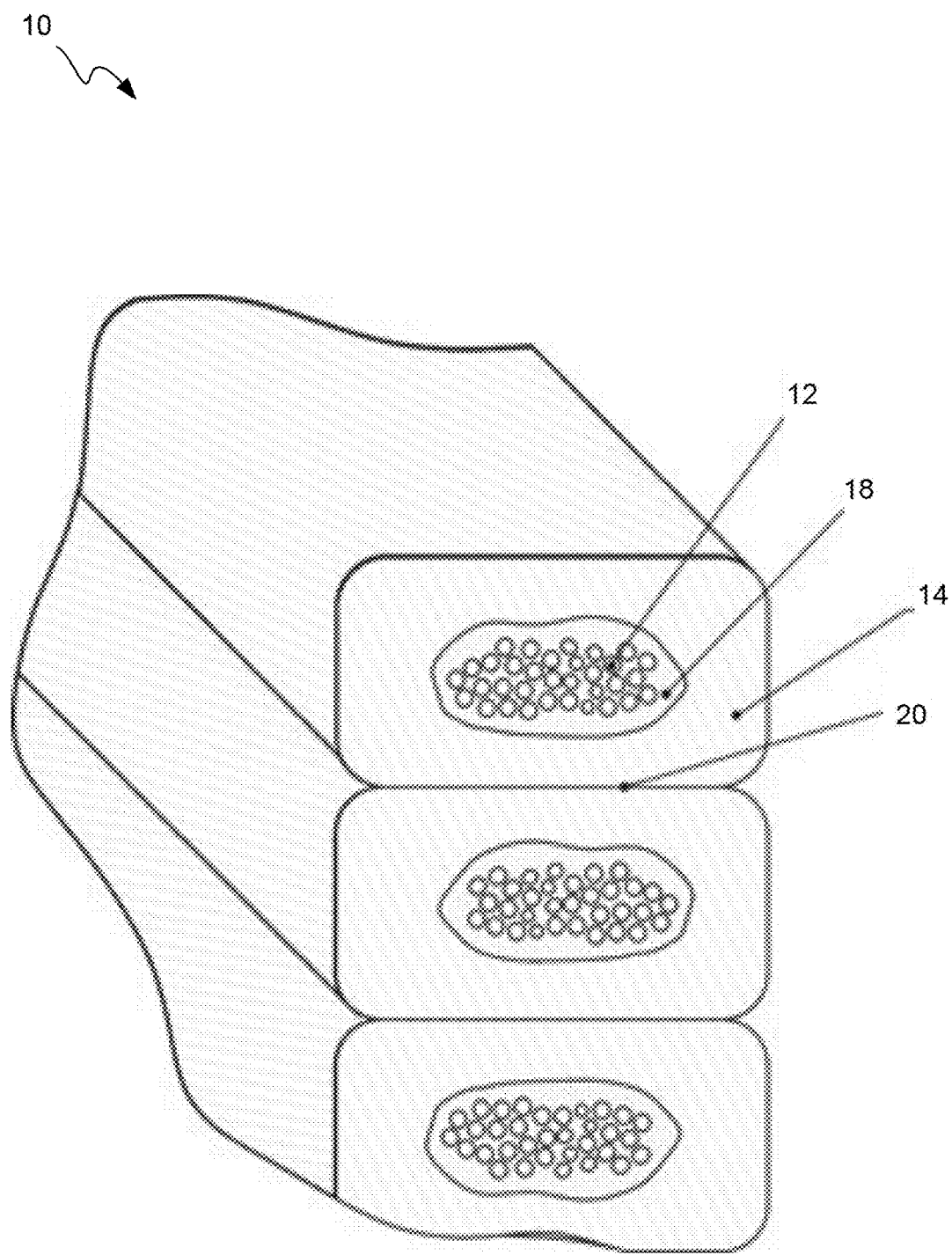
FIG. 2 illustrates in front perspective cutaway view multiple layers of an example 3D printed fiber-reinforced composite material according to one embodiment of the present disclosure.

Continuing with FIG. 2, multiple layers of an example 3D printed fiber-reinforced composite material are shown in front perspective cutaway view. As shown from this angle, printed layers 10 can be stacked atop each other in a continuous path 20 layer by layer. Again, each printed layer can include a fiber strand 12 embedded within a base composite material 14, with a fiber strand to base composite material interface 16. Fiber strand 12 can include multiple individual fibers that are impregnated with a binder or impregnation material 18, which is then encased within the base composite material 14. As shown, each of printed layers 10 can have a core-shell structure with the fiber strand 12 distributed around the central axis across each deposited layer in a longitudinal direction (i.e., into the page).

By controlling the feed rate of the fiber strand 12 and a rate of motion of a printing head depositing printed layers 10, a neutral to positive tension in the fiber strand 12 can be maintained between a printer outlet and the printed object via a tensile force along the fiber strand 12, with the resulting tension then increasing the tensile strength of the printed object.

Different shapes, diameters, and tolerances can be used for the fiber strand 12 to achieve various desired material properties in the printed object. In some embodiments, fiber strand 12 may have an elliptical shape and its size may vary slightly with regard to the tension applied. Table 1 below provides example fiber strand dimensions that may be varied based on the printing speed. Other printing speeds and other relative fiber strand dimensions and characteristics are also possible for alternative arrangements, as will be readily appreciated.

TABLE 1

| Printing speed (mm/s) | Average width (mm) | Average thickness (mm) |
|---|---|---|
| 40 | 3.95 ± 0.74 | 2.07 ± 0.24 |
| 80 | 4.11 ± 0.35 | 2.08 ± 0.31 |

TABLE 1-continued

| Printing speed (mm/s) | Average width (mm) | Average thickness (mm) |
|---|---|---|
| 120 | 4.42 ± 0.4 | 2.14 ± 0.22 |

Because varying types and sizes of fiber strands can be used and printing speeds can be varied as desired, it is possible to improve or adjust the mechanical performance of a 3D printed material by varying the volume ratio of the fiber strand and the base composite material. Such adjustments can also reduce material consumption and thus reduce manufacturing costs as well. 3D printing technology of continuously fiber reinforced free-radical polymerizable composite makes the material suitable for applications such as load-bearing structures and overhang structures used in the construction industry.

In various specific non-limiting examples provided for purposes of illustration only, an extrusion-based 3D printer can be equipped with a UV-LED light source to cure or harden the 3D printed layers immediately after printing. The UV-LED light source can have a peak wavelength of 415.6 nm, for example, with a maximum light intensity of 0.6 W/cm$^2$ and a beam size of 70×56 mm$^2$. Other parameters and dimensions are also possible. A printing speed of 40 mm/s can be applied with the feeding rate of the base composite material being about 0.213 L/hr, which can result in the formation of a layer with a width of 18 mm and a height of 4 mm. A continuous glass fiber strand having a linear density of 4800, 9600 and 19200 Tex can be used for reinforcement of the printed component. A comparative example showing observed printed component performance along printed layers of the base composition material with and without the fiber reinforcement is shown in Table 2 below.

TABLE 2

| Material performance | Composite material without reinforcement | Glass fiber reinforced composite material | | |
|---|---|---|---|---|
| | | 4800 Tex | 9600 Tex | 19200 Tex |
| Cross-section area percent | 0 | 2.6% | 5.2% | 10.5% |
| Ultimate tensile strength, MPa | 6.0 ± 1.0 | 28.9 ± 3.2 | 57.8 ± 7 | 116 ± 15 |
| Tensile elongation at break, % | 0.30 ± 0.05 | 1.96 ± 0.28 | 2.51 ± 0.46 | 2.65 ± 0.21 |
| Tensile modulus of elasticity, MPa | 3000 ± 100 | 4200 ± 320 | 9300 ± 340 | 13680 ± 420 |
| Ultimate compressive strength, MPa | 50.0 ± 4.0 | 48 ± 2 | 73 ± 2 | 88 ± 4 |
| Compressive relative deformation, % | 13.0 ± 1.6 | 2.5 ± 0.2 | 1.5 ± 40.1 | 1.1 ± 0.1 |
| Compressive modulus of elasticity, MPa | 1400 ± 460 | 4900 ± 600 | 8300 ± 1060 | 8800 ± 220 |
| Ultimate flexural strength, MPa | 11.0 ± 0.9 | 32 ± 2.9 | 63 ± 4.5 | 139 ± 11 |
| Flexural relative deformation, % | 0.8 ± 0.08 | 5.9 ± 1.4 | 5.6 ± 0.9 | 3.7 ± 0.4 |
| Flexural modulus of elasticity, MPa | 1400 ± 110 | 1600 ± 380 | 2800 ± 400 | 5600 ± 560 |
| Impact strength, kJ/m2 | 1.00 ± 0.05 | 17.3 ± 4 | 30 ± 8 | — |

As can be seen from Table 2, the material performance of the fiber-reinforced material in comparison with the unreinforced base composite material can improve in a variety of ways. For example, material performance can increase by a factor of 2-30 for tensile strength, can double for compression strength, and can increase by a factor of 3-6 for rigidity. Impact strength can also be improved drastically when a fiber strand with a linear density of 4800 Tex is applied, which was observed to result in a value of 30±8 kJ/m2 in comparison to only 1 kJ/m2 in the unreinforced base composite material. Accordingly, the material performance of building components and other objects that are 3D printed using the disclosed apparatuses systems and methods are substantially improved over that which was previously known in the art.

Figure 3:
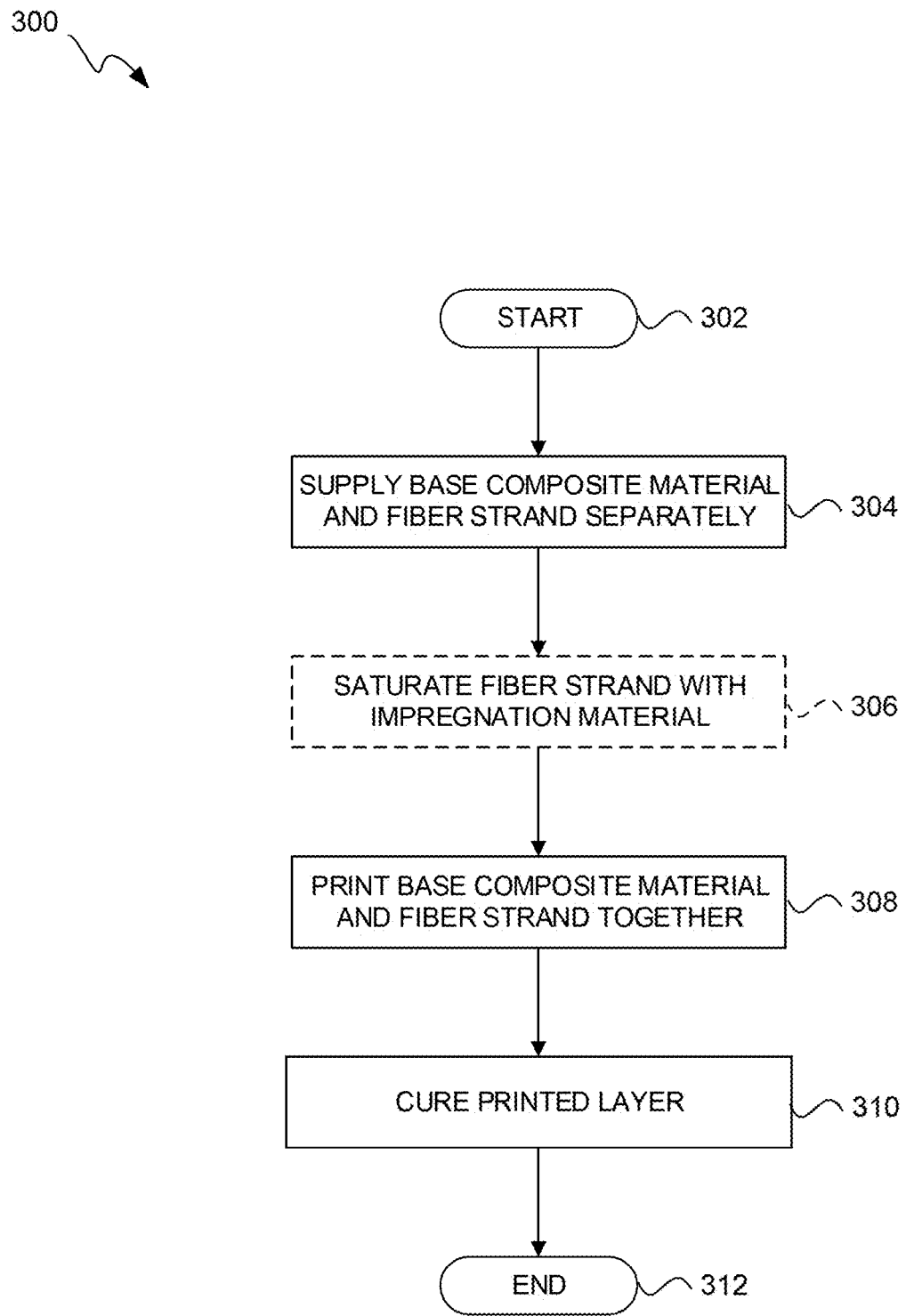
FIG. 3 illustrates a flowchart of an example method of 3D printing a fiber-reinforced composite material according to one embodiment of the present disclosure.

Transitioning now to FIG. 3, a flowchart of an example method 300 of 3D printing a fiber reinforced composite material is provided. After a start step 302, a first process step can involve supplying a base composite material and a fiber strand separately into a 3D printing apparatus. The base composite material can be from a base composite material supply and the fiber strand can be from a fiber strand supply. Both materials can be separately provided to a print head of the printing apparatus, specifically to a nozzle or extruder component.

At the following optional process step 306, the fiber strand can be saturated with a binder, such as an impregnation liquid or material. This step can be used when the fiber strand is not already pre-saturated with an impregnation material and can take place within the printing apparatus. For example, step 306 can occur after the fiber strand leaves the fiber strand supply but before it arrives at the nozzle or extruder to be printed.

At subsequent process step 308, the base composite material and fiber strand can be printed together simultaneously to form a 3D printed layer. For example, the fiber strand can be extruded from a nozzle or extruder of a printer head atop, beneath, or partially embedded within the base composite material being printed or extruded at the same time.

At the next process step 310, the printed layer can be cured. This can involve the use of heat and/or an electromagnetic radiation source, such as UV light. After curing, a printed layer is formed with the fiber strand embedded within the base composite material, such as that which is shown in the printed layers of FIGS. 1 and 2 above. The process can then be repeated if where multiple printed layers are desired. The method then ends at end step 312.

In various embodiments, one or more of steps 304-310 can be omitted and/or other steps can be added. For example, the step of moving a printer head during the printing process can be included. Furthermore, various steps can be performed in a different order and some steps can be performed simultaneously. For example, all of steps 304-310 can be performed simultaneously during a continuous 3D printing process. It will also be readily appreciated that method 300 is a relatively high-level overview of a 3D printing process, and that various details and steps have not been included at this stage for purposes of simplicity. Further detailed steps and description are provided below with respect to the detailed method set forth in FIG. 10.

Figure 4:
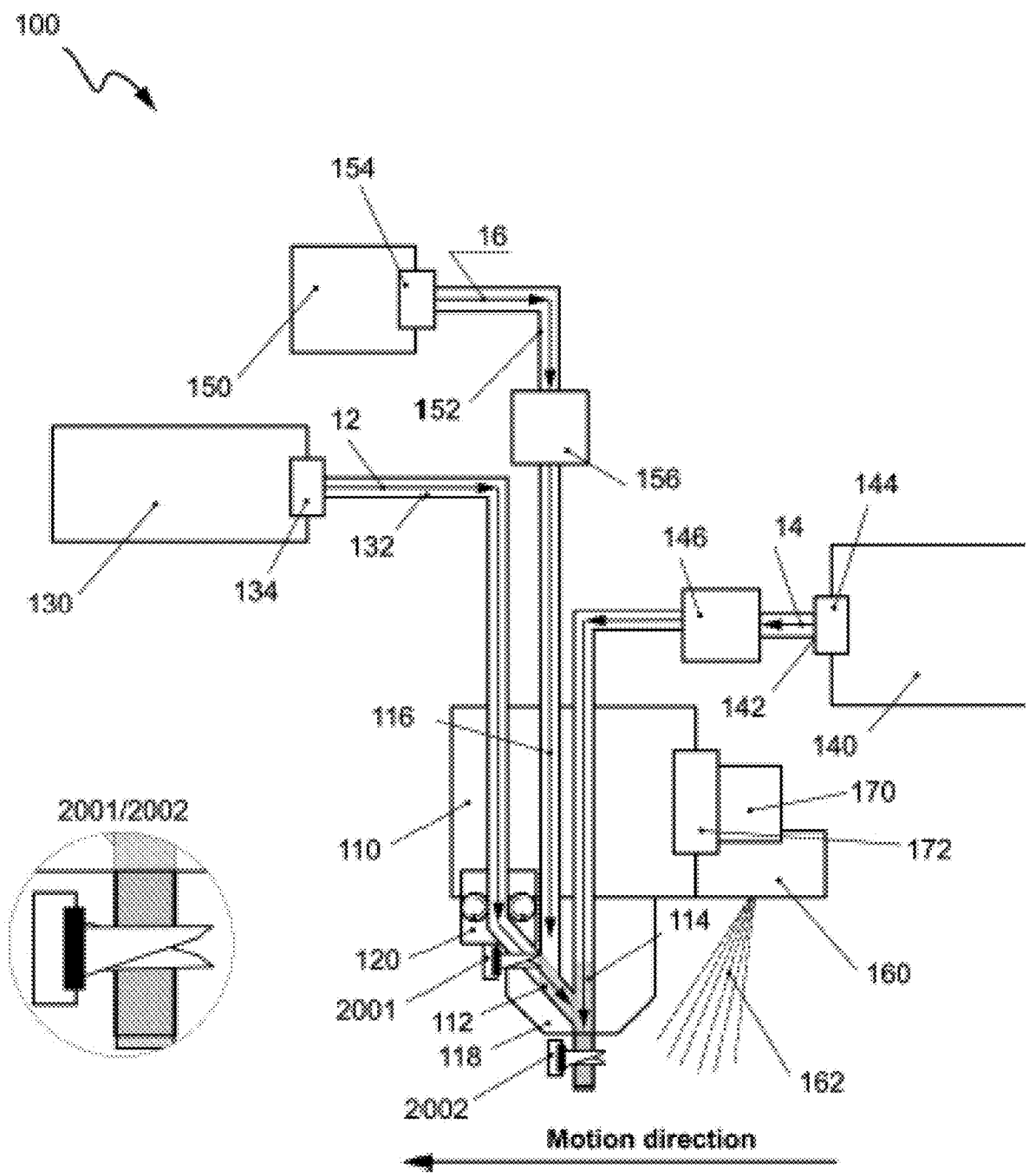
FIG. 4 illustrates a schematic diagram of an example 3D printing system according to one embodiment of the present disclosure.

Moving next to FIG. 4 an example 3D printing system is illustrated in schematic diagram format. 3D printing system 100 can include a movable printer head 110 housing a plurality of 3D system components. These can include at least a fiber strand channel 112 located within the printer head 110 and configured to pass a fiber strand through the printer head 110 and a base composite material channel 114 located within the printer head 110 and configured to pass a base composite material through the printer head 110. The fiber strand 12 can be separate from the base composite material 14 until they meet within or just after an extruding nozzle 118, which can also be located at printer head 110.

Printer head 110 can also include an impregnation material channel 116 configured to pass an impregnation liquid or material 16 to impregnate the fiber strand 12 while the fiber strand is within the printer head 110. Printer head can also include a fiber feeding component 120 configured to feed the fiber strand 12 through the fiber channel 112. This fiber feeding component 120 can facilitate the combining of the fiber strand 12 with the base composite material 14 to form a layer of a 3D printed building component with the fiber strand 12 within the base composite material 14, such as that which is shown in FIGS. 1 and 2. Further details regarding the fiber feeding component are provided with respect to FIG. 5 below. Again, the finished 3D printed building component can have material properties that meet or exceed standard building construction codes, among other superior features.

3D printing system 100 can also include a fiber strand supply 130 that supplies the fiber strand 12 along a fiber strand route 132 into the printer head 110. The fiber strand supply 130, which can be a spool of unimpregnated fiber strand in some arrangements, can be replaceable and ultimately supplies the fiber strand 12 into the fiber strand channel 112. A fiber strand supply connector 134 can couple the fiber strand channel 112 to the fiber strand supply 130. Such a fiber strand supply connector can be flexibly movable, so as to facilitate movement of the printer head 110 during 3D printing operations.

In various embodiments this reinforcing material of the final product can be a continuous directional fiber strand that is flexible enough to be wound around a spool located in the fiber strand supply 130. Fiber strand 12 can be one of various types of organic or inorganic fibers, such as nylon, aramid, carbon, glass fiber, basalt, aramid, and silk, among other suitable fibers.

3D printing system 100 can also include a base composite material supply 140 that supplies the base composite material 14 along a base composite material route 142 into the printer head 110. The base composite material supply 140 can be replaceable and ultimately supplies the base composite material 14 into the base composite material channel 114. A base composite material supply connector 144 can couple the base composite material channel 114 to the base composite material supply 140, and can be flexibly movable, so as to facilitate movement of the printer head 110 during 3D printing operations. A base composite material transfer pump 146 can facilitate pumping the base composite material along base composite material route 142.

In various embodiments, the base composite material 14 can comprise a free-radical polymerizable material. Exemplary resins or materials may include one or more acrylic monomers and/or oligomers, an inorganic filler or combination of the fillers (which may impart beneficial properties to the composition) and one or more types of soluble polymerization initiators. Properties of the base composite material 14 can be dependent on the quantity of the components utilized in the formulation. The matrix composite may be used to coat, encase, or otherwise surround any number of continuous reinforcements (e.g., fiber strands) and, together with the reinforcements, make at least a portion (e.g., a wall) of composite 3D printed building component or structure.

3D printing system 100 can also include an impregnation material supply 150 that supplies the impregnation material 16 along an impregnation material route 152 into the printer head 110. The impregnation material supply 150 can be replaceable and ultimately supplies the impregnation material 16 into the impregnation material channel 116. An impregnation material supply connector 154 can couple the impregnation material channel 116 to the impregnation material supply 150, and can be flexibly movable, so as to facilitate movement of the printer head 110 during 3D printing operations. An impregnation material transfer pump 156 can facilitate pumping the impregnation material along impregnation material route 152. In various embodiments, impregnation material 16 may include a free-radical polymerizable low viscous liquid mixture comprising one or more acrylate monomers or oligomers, and at least one initiator of photopolymerization.

Fiber impregnation can take place toward the end of the fiber strand channel 112, and the fiber strand covered with the binder or impregnation material can be fed through an outlet of the nozzle 118 simultaneously with the extruded layer of the base composite material 14. In some embodiments, the fiber strand 12 can be supplied as already being pre-impregnated. In such cases, impregnation material 16 and its associated components may not be used or even be present in such embodiments.

In some arrangements, the fiber feeding component 120 can include a cutter 2001, such that the fiber strand can be cut so that only base composite material is extruded from the nozzle after cutting the fiber strand. Cutter 2001 can be mounted before the impregnation material channel 116 or at the outlet of nozzle 118 in various arrangements. Cutter 2001 can be automated in some arrangements, such that the 3D printing apparatus can print some layers having the embedded fiber strand and other layers without it. This may be desirable in complex arrangements where the use of the fiber strand can limit flexibility in complex creations and/or can be more expensive, such that occasional regions of non-reinforced layers may be acceptable in non-load bearing regions that are not critical for having enhanced material characteristics. A similar cutter 2002 can be used to cut the material being extruded from the nozzle 118, which material can be the base composite material alone or the base composite material combined with a fiber strand.

In addition, an energy source 160 can provide a curing component such as heat or electromagnetic radiation to cure a continuous printed layer just after it is printed. For example, a UV light 162 can be included in 3D printing system 100. In some arrangements, energy source 160 can be mounted proximate printer head 110 in such a way that the electromagnetic radiation forms a spot of radiation on the surface of the freshly discharged layer in the direction of movement of the printer head 110. In some embodiments, electromagnetically and thermally induced polymerization processes may be applied sequentially.

Still further, a moving printing device 170, such as a robotic arm or CNC, can be configured to move the printer head 110 during operation of the 3D printing system, and a coupling component 172 can couple the printer head 110 to the moving printing device 170.

In various embodiments, a flow rate of the base composite material can range from about 8 to 245 L/hour and the flow rate of the impregnation material can range from about 0.2 to 8.0 L/hour. These flow rates can vary and can be chosen according to the desired printing speed, the type and size of printed fiber used, the extruded layer configuration, and other pertinent factors. In some arrangements the printing speed can range from about 40 to 1000 mm/sec, providing flexibility in the 3D printing process, the ability to print objects with complex geometries, and enabling significant time reductions in the overall process.

Figure 5:
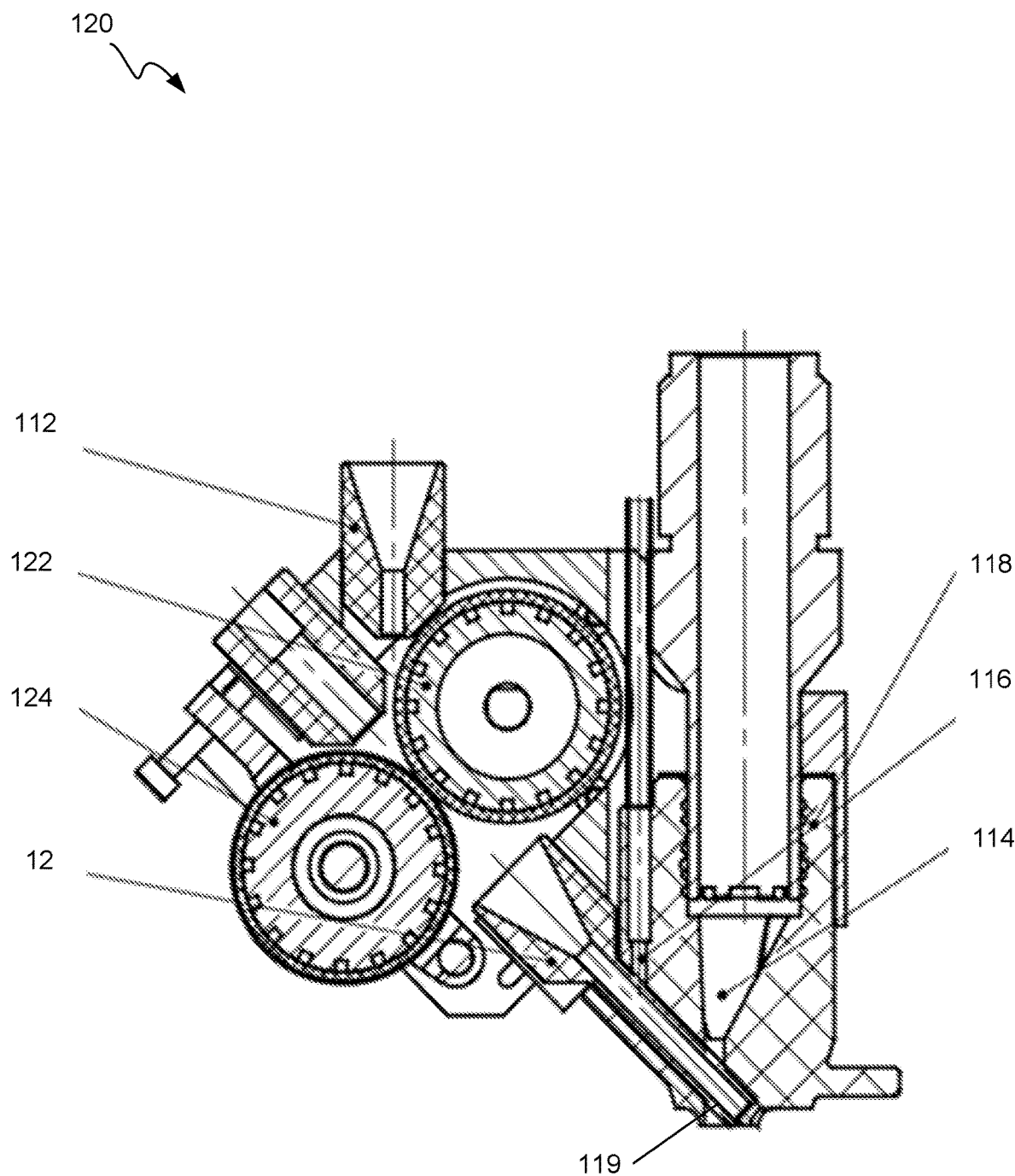
FIG. 5 illustrates in side cross-section view an example 3D printing apparatus according to one embodiment of the present disclosure.

Continuing with FIG. 5 an example 3D printing apparatus is illustrated in side cross-section view. Fiber feeding component 120 can be a 3D printing apparatus that is part of an overall 3D printing system, such as that which is set forth in FIG. 4 above. Fiber feeding component 120 can be configured to feed a continuous fiber strand through the rest of the 3D printing apparatus or system. An outfeeder component can include a start roller 122 and a second roller 124, which combine to feed a fiber strand 12 through a fiber strand channel 112 and into nozzle 118 for printing.

The rollers 122, 124 can manually push or pull the fiber strand 12 through the 3D printing apparatus until it meets up with impregnation material coming from impregnation material channel 116 and base composite material from base composite material channel 114, which can all take place just before or right at nozzle outlet 119. In some arrangements, the various channels 112, 114, 116 can be united sequentially proximate the nozzle outlet 119. The arrangement of fiber feeding component 120 can provide at least three different modes for fiber strand laying which are determined by the position of the outlet of fiber strand channel 112 relative to the outlet of base composite material channel 114.

In one embodiment, the outlet of fiber strand channel 112 may be positioned above the outlet of base composite material channel 114. In this arrangement, the fiber strand can be extruded on the top of the simultaneously extruded layer of the base composite material and also partially inserted into the extruded layer of the base composite material at printing. This can involve about 70-90% of the fiber strand cross-sectional area being inserted or embedded into the extruded layer, for example.

In another embodiment, the outlet of fiber strand channel 112 may be positioned coaxially with the outlet of base composite material channel 114. In this arrangement, the fiber can be fully embedded within the extruded layer of the base composite material at printing. In yet another embodiment, the outlet of fiber strand channel 112 may be positioned below the outlet of base composite material channel 114, such that the fiber strand is extruded underneath the extruded layer of the base composite material at printing.

In various arrangements, the fiber feeding component 120 can include a connector configured to mount it to a moving printing device. In one embodiment, the moving printing device can be a CNC system. In another embodiment, the motion printing device can be a robotic arm. Other types of moving printing devices are also possible, and the location of the mounting for such a moving printing device can be located elsewhere on the printer or system.

Figure 6:
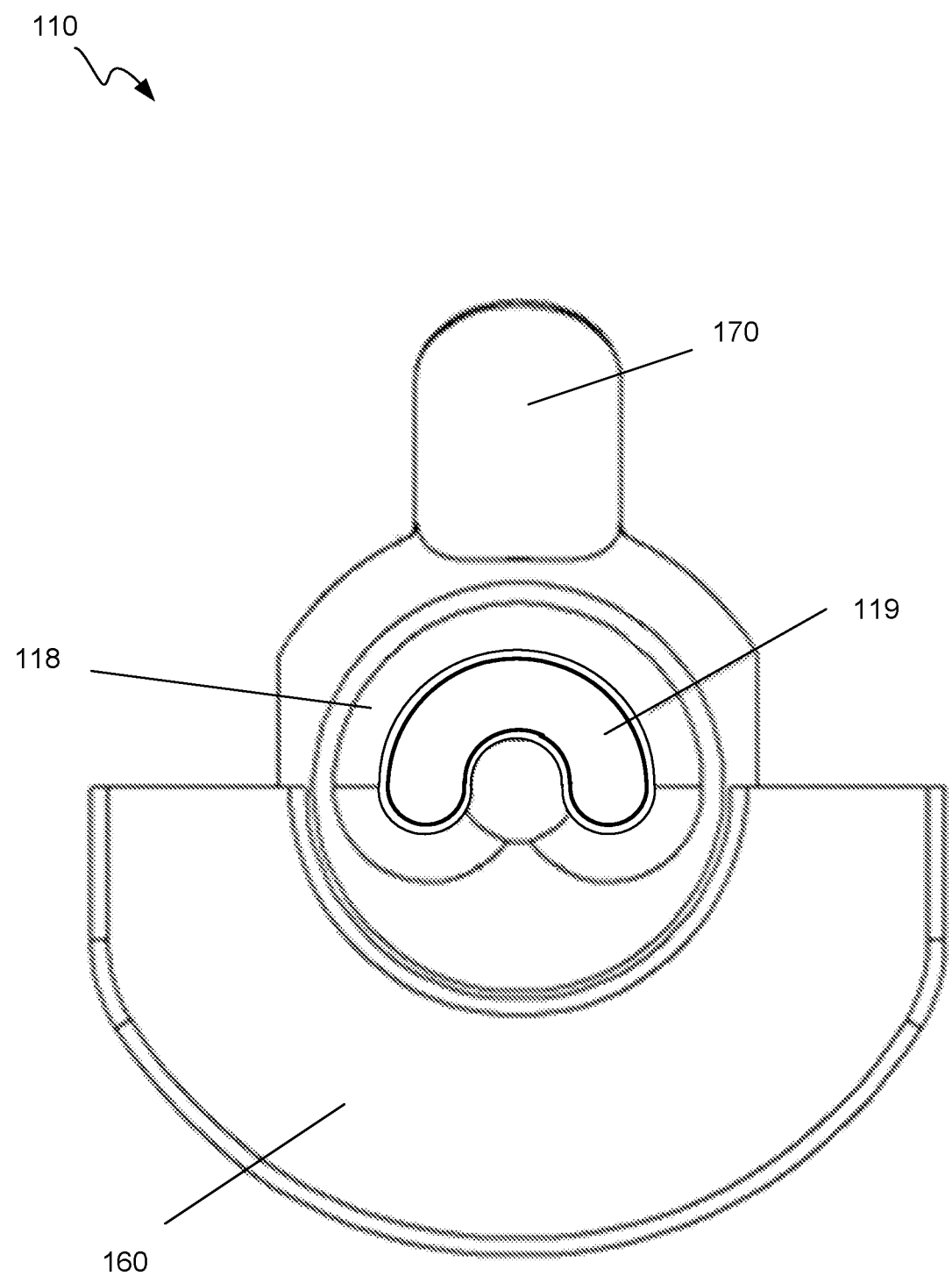
FIG. 6 illustrates in bottom plan view an example nozzle configuration for a 3D printing apparatus according to one embodiment of the present disclosure.

FIG. 6 illustrates in bottom plan view an example nozzle configuration for a 3D printing apparatus. Again, movable printer head 110 can include an energy source 160 for curing freshly printed material, a moving printing device 170 configured to move the printer head 110 in a variety of directions and speeds during printing, and a nozzle 118 having an outlet 119 configured to extrude the fiber strand and base composite material during 3D printing, among other printer head components.

In general, the dimensions of the extruded printed layer are largely determined by the geometry of the nozzle outlet 119. Depending upon the size and shape of the nozzle outlet, the width of the printed layer can range from about 10 to 26 mm in some arrangements. By applying a nozzle 118 with an outlet 119 having a diameter of 10 mm, for example, the printed layer width may be set at about 10 to 13 mm. By increasing the nozzle outlet diameter up to 14 mm, the printed layer width may be set to about 14 to 18 mm. For a nozzle having an outlet diameter of 20 mm, the width of the printed layer may be set to about 20 to 26 mm. Other sizes and ranges for nozzle outlets and printed layer widths are also possible, as will be readily appreciated.

Thickness of the printed layer can be managed by varying the distance from the nozzle outlet to the printing surface of the previously deposited layer and by varying the curing depth of the overall layered composite material. The printed layer cross-sectional area can be determined by varying the linear density of the fiber strand such that the ratio of the cross-sectional area of the fiber strand to the cross-sectional area of the printed layer. For example, this ratio may range from about 1% to about 20% of the average cross-sectional area of the printed layer of base composite material in order to provide desirable mechanical performance characteristics in the finished printed building component or object.

Figure 7A:
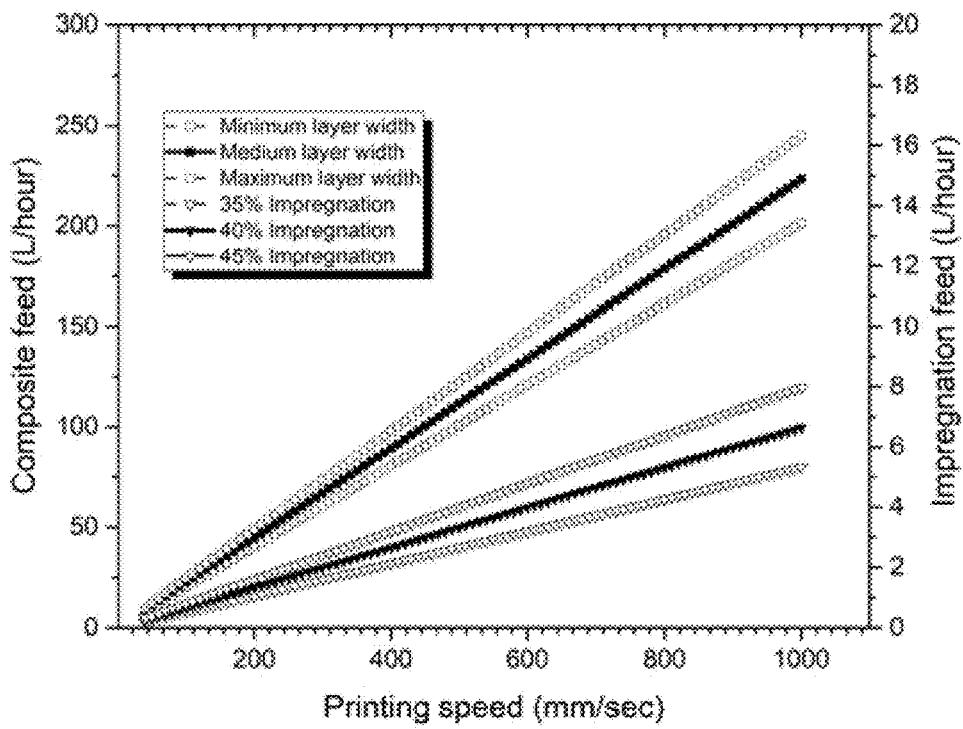
FIG. 7A illustrates a graph of example relationships of composite base material flow rate and impregnation material flowrate to printing speed according to one embodiment of the present disclosure.
Figure 7B:
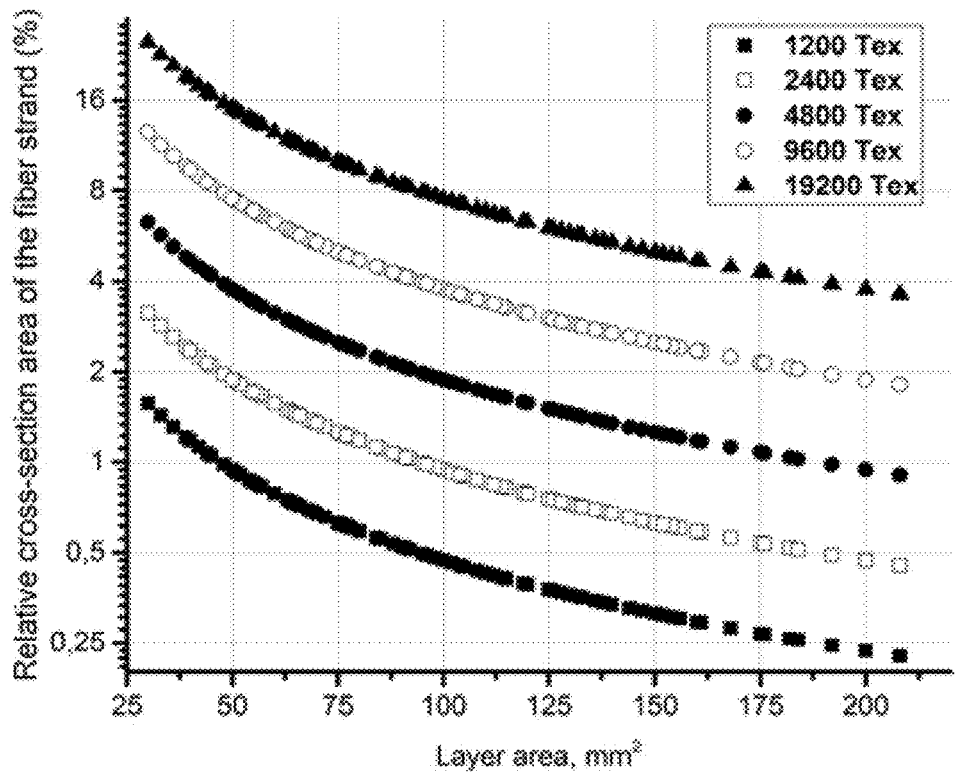
FIG. 7B illustrates a graph of example relationships of printed layer cross-sectional area to fiber strand cross-sectional area according to one embodiment of the present disclosure.

FIGS. 7A and 7B provide graphs of example relationships for the 3D printed layered materials. FIG. 7A shows various composite base material flow rates and impregnation material flowrates to printing speeds, while FIG. 7B shows printed layer cross-sectional area to fiber strand cross-sectional area. The provided graphs show experienced relative rates for printing when various material characteristics are varied and measured material properties over a variety of different printed layered materials using the disclosed systems and methods.

Figure 8A:
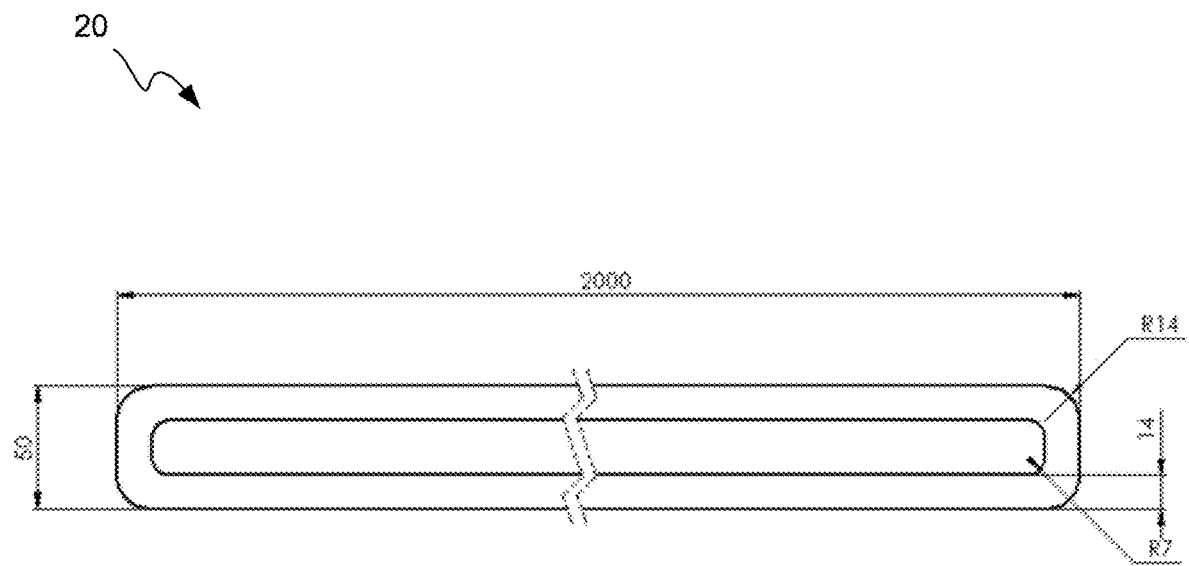
FIG. 8A illustrates in side cross-section view an example layer of fiber-reinforced composite material according to one embodiment of the present disclosure.
Figure 8B:
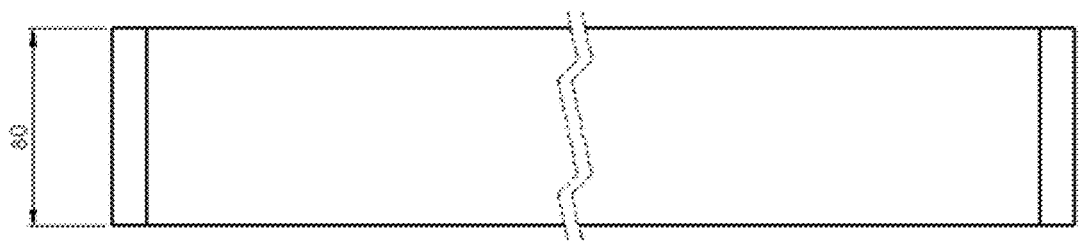
FIG. 8B illustrates in top plan view the layer of fiber-reinforced composite material of FIG. 8A according to one embodiment of the present disclosure.

FIGS. 8A and 8B illustrate an example ideal layer of 3D printed fiber-reinforced composite material in side elevation and top plan views respectively. Ideal layer can be used to measure warpage values at different conditions and represents the dimensions of a perfectly flat and straight printed layer. In various arrangements, ideal layer 20 can be used as a baseline for conducting relative warpage tests on printed layers that are 3D printed using a variety of materials, speeds, and techniques. It is notable that warpage of 3D printed layers correlates significantly to the viscosity of the base composite material, such that controlling this viscosity may be desirable in many cases. In particular, favorable use of reinforcement can be helpful, particularly fiber strand reinforcement.

Due to typical exothermic photopolymer cure reactions, the warpage effect that is often seen in 3D printed materials can be mitigated through reinforcement. In various embodiments, the base composite material may include one or more plasticizes, such as organophosphates or trimellitates. This can be at concentrations below 12 wt % of the composite mass for reducing composite matrix rigidity and enhancing the mechanical performance of the printed parts due to more efficient transfer of the load from the base composite material to the fiber strand during experienced loads on the printed objects.

Figure 9:
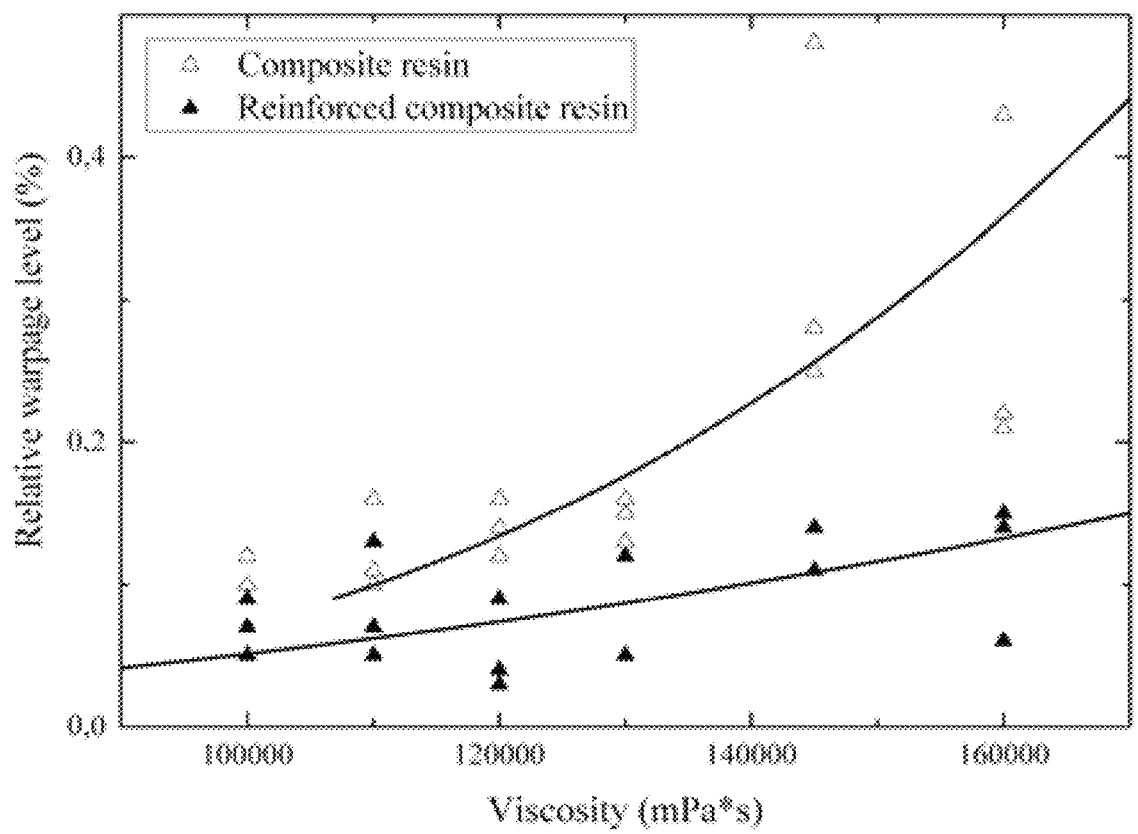
FIG. 9 illustrates a graph of example relationships of base composite material viscosity to relative warpage according to one embodiment of the present disclosure.

FIG. 9 illustrates a graph of example relationships of base composite material viscosity to relative warpage. In the measured examples graphed in FIG. 9, the influence of a composite resin reinforcement and a chlorinated organophosphate addition as a plasticizer on the warpage level as a function of the base composite resin viscosity is provided. The evaluation was performed on simple parts, such as 3D printed walls with a rectangular cross-section, as exemplified in FIGS. 8A-8B. As shown, relative warpage percentages are generally smaller for lower viscosities, but are substantially reduced with the addition of a reinforcement material such as the fiber strand variations set forth herein.

Figure 10:
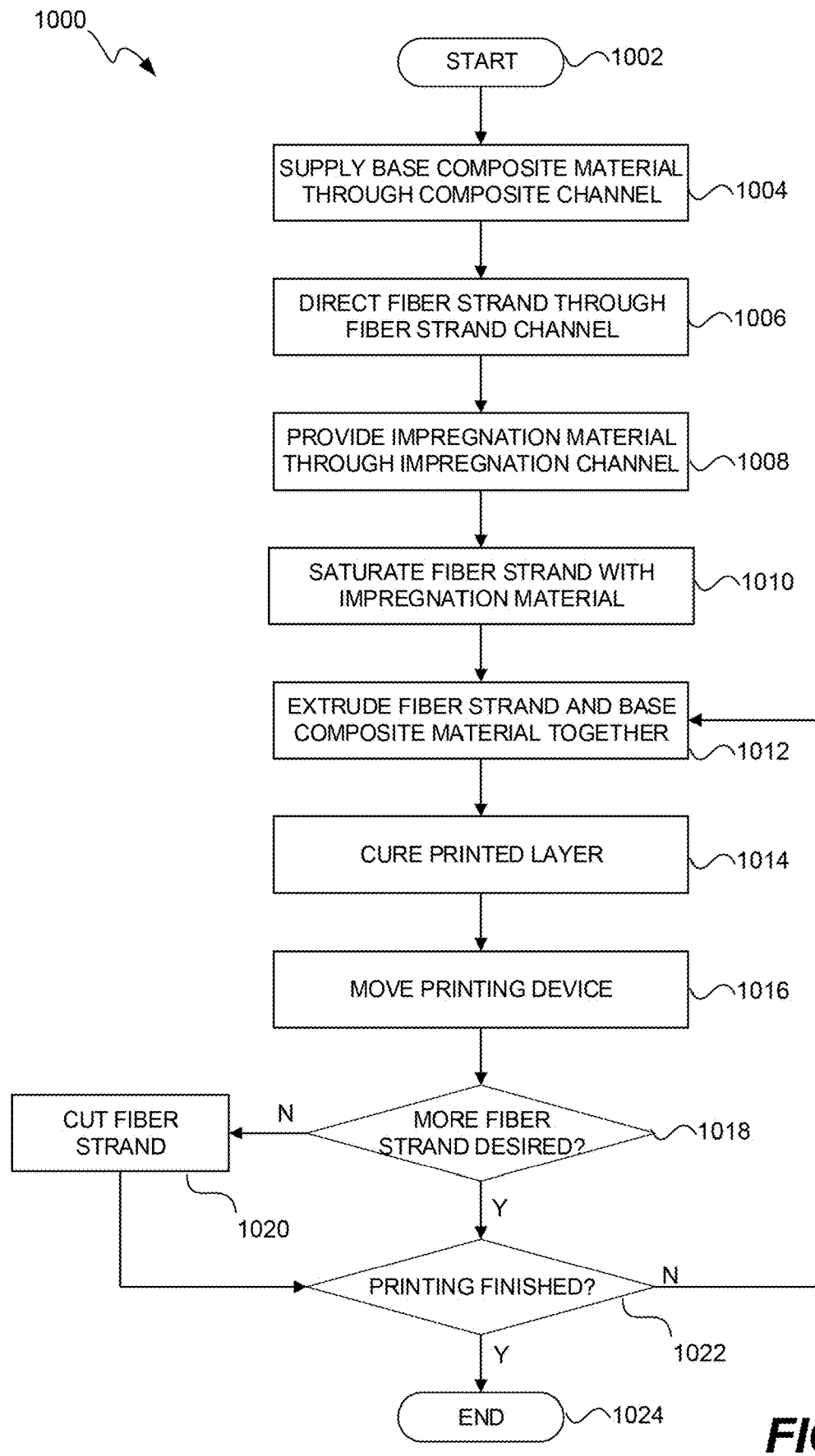
FIG. 10 illustrates a flowchart of an example method of 3D printing a building component having material properties that meet or exceed standard building construction codes according to one embodiment of the present disclosure.

Turning lastly to FIG. 10, a flowchart of an example method 1000 of 3D printing a building component having material properties that meet or exceed standard building construction codes is provided. It will be appreciated that method 1000 represents just one way of a variety of ways of printing a building component by combining a separate fiber strand with a base composite material at the printing apparatus, and that other variations and extrapolations of the disclosed exemplary method are also possible. Not every step provided is necessary, and further steps not disclosed in detail may also be added. Furthermore, the order of steps may be altered, and some steps may be performed simultaneously. For example, all steps may be performed simultaneously in some continuous printing processes.

After a start step 1002, a first process step 1004 can involve supplying a base composite material through a base composite material channel. The base composite material channel can be located within a moving printer head as noted above and can be fed from a replaceable base composite material source located outside the printer head.

At the following process step 1006, a fiber strand can be directed through a separate fiber strand channel. This fiber strand channel can also be located within the moving printer head and can be fed from a replaceable fiber strand source located outside the printer head.

At subsequent process step 1008, an impregnation material can be provided through a separate impregnation material channel. The impregnation material can be a liquid suitable to impregnate the fiber strand to facilitate binding of the fiber strand to the particular base composite material being used. The impregnation material channel can also be located within the moving printer head and can be fed from a replaceable impregnation material source located outside the printer head.

At the next process step 1010, the fiber strand can be saturated with the impregnation material. This can take place within the printer head and may be toward the end of the fiber strand channel. In various embodiments, a pre-saturated fiber strand may be used, such that process step 1008 and 1010 can optionally be skipped.

At a following process step 1012, the impregnated fiber strand and the base composite material can be extruded together simultaneously to form a deposited or 3D printed layer. The fiber strand can be laid atop, beneath, or within the base composite material layer depending upon the nozzle outlet configuration, as noted above.

At subsequent process step 1014, the printed layer of a fiber strand core surrounded by a base composite material can then be cured. This can be accomplished using heat or an irradiation source, such as UV light. In some arrangements, the curing component can trail the nozzle outlet in the direction of the printer head, such that curing takes place immediately after the printed layer is extruded from the nozzle.

At process step 1016, the printing device can be moved. This can facilitate the 3D printing of a continuous layer, which may continue for layer upon layer of extruded material, as shown above in FIG. 1. As will be readily appreciated, process step 1016 can be performed simultaneously with other process steps to facilitate a continuous printing process.

At decision step 1018 an inquiry can be made as to whether further fiber strand is desired in the ongoing printed layer. If not, then the method continues to process step 1020 where the fiber strand can be cut. In such instances, the 3D printing can continue with only base composite material then being printed without a fiber strand core.

If more fiber strand is desired, then the method can continue to decision step 1022, where an inquiry can be made as to whether the printing is finished. If not, then the method can revert to process step 1012 and repeat all steps thereafter. In some arrangements, the method can revert even farther back, such as to process step 1004, all steps can then be repeated. If it is printing is in fact finished at decision step 1024, however, then the method ends at end step 1026.

Although the foregoing disclosure has been described in detail by way of illustration and example for purposes of clarity and understanding, it will be recognized that the above-described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A three-dimensional ("3D") printing apparatus, comprising:
   a base composite material channel configured to pass a base composite material through the 3D printing apparatus, wherein the 3D printing apparatus is configured to 3D print the base composite material as a standalone 3D printing material;
   a fiber strand channel configured to pass a fiber strand through the 3D printing apparatus, wherein the fiber strand is separate from the base composite material, and wherein the fiber strand channel meets the base composite material channel at a first location within the 3D printing apparatus;
   an impregnation material channel configured to pass an impregnation material to impregnate the fiber strand while the fiber strand is within the 3D printing apparatus, wherein the fiber strand channel meets the impregnation material channel at a second location within the 3D printing apparatus that is before the first location; and
   a fiber feeding component located along the fiber strand channel proximate the first location and configured to feed the fiber strand through the fiber strand channel, wherein the fiber feeding component facilitates impregnating the fiber strand with the impregnation material at the second location within the 3D printing apparatus to form an impregnated fiber strand and then facilitates combining the impregnated fiber strand with the base composite material at the first location within the 3D printing apparatus to form a layer of a 3D printed building component with the impregnated fiber strand located within the base composite material, and wherein the 3D printing apparatus is also configured to 3D print the base composite material and the impregnated fiber strand as a combined 3D printing material.

2. The 3D printing apparatus of claim 1, further comprising:
   a fiber strand supply connector configured to couple the fiber strand channel to a separate replaceable fiber strand supply; and
   an impregnation material supply connector configured to couple the impregnation material channel to a separate replaceable impregnation material supply.

3. The 3D printing apparatus of claim 2, further comprising:
   a base composite material supply connector configured to couple the base composite material channel to a separate replaceable base composite material supply.

4. The 3D printing apparatus of claim 1, wherein the impregnation material is a liquid and the volume of impregnation liquid passing through the impregnation material channel ranges from about 0.2 to 8.0 L/hr.

5. The 3D printing apparatus of claim 1, wherein the volume of base composite material passing through the base composite material channel ranges from about 8 to 245 L/hr and an extrusion speed of the fiber strand ranges from about 40 to 1000 mm/s.

6. The 3D printing apparatus of claim 1, wherein an outlet of the fiber strand channel is positioned above an outlet of the base composite material channel to facilitate extrusion of the fiber strand on top of the extruded base composite material.

7. The 3D printing apparatus of claim 1, wherein an outlet of the fiber strand channel is positioned below an outlet of the base composite material channel to facilitate extrusion of the fiber strand underneath the extruded base composite material.

8. The 3D printing apparatus of claim 1, further comprising:
   a coupling component configured to couple the 3D printing apparatus to a moving printing device.

9. The 3D printing apparatus of claim 8, wherein the moving printing device is a computer numerical control system or robotic arm.

10. The 3D printing apparatus of claim 1, further comprising:
    a base composite supply connector configured to couple the base composite material channel to a separate replaceable base composite material supply; and
    a fiber strand supply connector configured to couple the fiber strand channel to a separate replaceable fiber strand supply.

11. The 3D printing apparatus of claim 1, wherein the 3D printed building component has material properties that include:
    an ultimate compressive strength from about 45 to 92 MPa,
    a compressive modulus of elasticity from about 4 to 10 GPa,
    a relative deformation at compression from about 2 to 7 percent,
    an ultimate tensile strength from about 12 to 180 Mpa,
    a tensile modulus of elasticity from about 2 to 20 GPa,
    a relative deformation in tension from about 1 to 4 percent,
    an ultimate flexural strength from about 30 to 180 Mpa,
    a modulus of elasticity from about 1 to 8 GPa,
    a relative flexural deformation from about 2 to 8 percent,
    an impact strength from about 8 to 46 kJ/m2, and
    a vapor permeability of about 0.59 perm-inch.

12. The 3D printing apparatus of claim 1, further comprising:
    a first cutter located along the fiber strand channel between the fiber feeding component and the impregnation channel, the first cutter being configured to cut the fiber strand within the 3D printing apparatus during a printing operation of the 3D printing apparatus.

13. The 3D printing apparatus of claim 12, wherein the 3D printing apparatus is configured to 3D print the base composite material and the impregnated fiber strand as a combined 3D printing material before the first cutter cuts the fiber strand and to continue 3D printing the base composite material without the impregnated fiber strand after the first cutter cuts the fiber strand.

14. The 3D printing apparatus of claim 13, wherein the 3D printing apparatus is further configured to reintroduce the impregnated fiber strand into the base composite material after printing the base composite material without the impregnated fiber strand during a continuous printing operation of the 3D printing apparatus.

15. The 3D printing apparatus of claim 12, further comprising:
    a second cutter configured to cut the base composite material as the base composite material exits the 3D printing apparatus.

16. A 3D printing system, comprising:
    a movable printer head housing a plurality of 3D system components;
    a base composite material channel located within the printer head and configured to pass a base composite material through the printer head, wherein the printer head is configured to 3D print the base composite material as a standalone 3D printing material;
    a fiber strand channel located within the printer head and configured to pass a fiber strand through the printer head, wherein the fiber strand is separate from the base composite material, wherein the fiber strand channel meets the base composite material channel at a first location within the printer head;
    an impregnation material channel located within the printer head and configured to pass an impregnation material to impregnate the fiber strand while the fiber strand is within the printer head, wherein the fiber strand channel meets the impregnation material channel at a second location within the printer head that is before the first location;
    a fiber feeding component located within the printer head and configured to feed the fiber strand through the fiber channel, wherein the fiber feeding component facilitates impregnating the fiber strand with the impregnation material at the second location within the printer head to form an impregnated fiber strand and then facilitates combining the impregnated fiber strand with the base composite material at the first location within the printer head to form a layer of a 3D printed building component with the impregnated fiber strand located within the base composite material, and wherein the printer head is also configured to 3D print the base composite material and the impregnated fiber strand as a combined 3D printing material;

a base composite material supply, wherein the base composite material supply is replaceable and supplies the base composite material into the base composite material channel;

a base composite material supply connector coupling the base composite material channel to the base composite material supply;

a fiber strand supply, wherein the fiber strand supply is replaceable and supplies the fiber strand into the fiber strand channel;

a fiber strand supply connector coupling the fiber strand channel to the fiber strand supply;

an impregnation material supply, wherein the impregnation material supply is replaceable and supplies the impregnation material into the impregnation material channel;

an impregnation material supply connector coupling the impregnation material channel to the impregnation material supply;

a moving printing device configured to move the printer head during operation of the 3D printing system; and a coupling component coupling the printer head to the moving printing device.

17. The 3D printing system of claim 16, wherein the 3D printed building component has material properties that include:
an ultimate compressive strength from about 45 to 92 MPa,
a compressive modulus of elasticity from about 4 to 8 GPa,
a relative deformation at compression from about 2 to 10 percent,
an ultimate tensile strength from about 12 to 180 Mpa,
a tensile modulus of elasticity from about 2 to 20 GPa,
a relative deformation in tension from about 1 to 4 percent,
an ultimate flexural strength from about 30 to 180 Mpa,
a modulus of elasticity from about 1 to 8 GPa,
a relative flexural deformation from about 2 to 8 percent,
an impact strength from about 8 to 46 kJ/m2, and
a vapor permeability of about 0.59 perm-inch.

18. The 3D printing system of claim 16, wherein the base composite material supply includes the base composite material, the base composite material including at least one acrylic monomer or oligomer, inorganic fillers, and at least one soluble polymerization initiator.

19. The 3D printing system of claim 18, wherein the base composite material further includes a thickener, and adhesion promoter, a toughening agent, one or more plasticizers, and at least one flame retardant.

20. The 3D printing system of claim 16, wherein the fiber strand supply includes the fiber strand, the fiber strand including one or more materials selected from the group consisting of nylon, aramid, carbon, glass, basalt, and silk.

21. The 3D printing system of claim 16, wherein the impregnation material supply includes the impregnation material, the impregnation material including a free-radical polymerizable low viscous liquid mixture having one or more acrylate monomers or oligomers and at least one initiator of photopolymerization.

22. A 3D printing system, comprising:
a printer head;
a base composite material channel located within the printer head and configured to pass a base composite material therethrough, wherein the printer head is configured to extrude the base composite material as a standalone 3D printing material;
a fiber strand channel located within the printer head and configured to pass a fiber strand separate from the base composite material therethrough, wherein the fiber strand channel meets the base composite material channel at a first location within the printer head;
an impregnation material channel located within the printer head and configured to pass an impregnation material therethrough to impregnate the fiber strand while the fiber strand is within the printer head, wherein the fiber strand channel meets the impregnation material channel at a second location within the printer head that is before the first location; and
a fiber feeding component located within the printer head and configured to feed the fiber strand through the fiber strand channel, wherein the fiber feeding component facilitates impregnating the fiber strand with the impregnation material at the second location to form an impregnated fiber strand and also facilitates combining the impregnated fiber strand with the base composite material at the first location to form a combined 3D printing material within the printer head, and wherein the printer head is also configured to extrude the combined 3D printing material including the base composite material and the impregnated fiber strand.

* * * * *